July 23, 1963
C. J. MAXWELL
3,098,428
MASONRY BARBECUE PIT
Filed Oct. 6, 1961
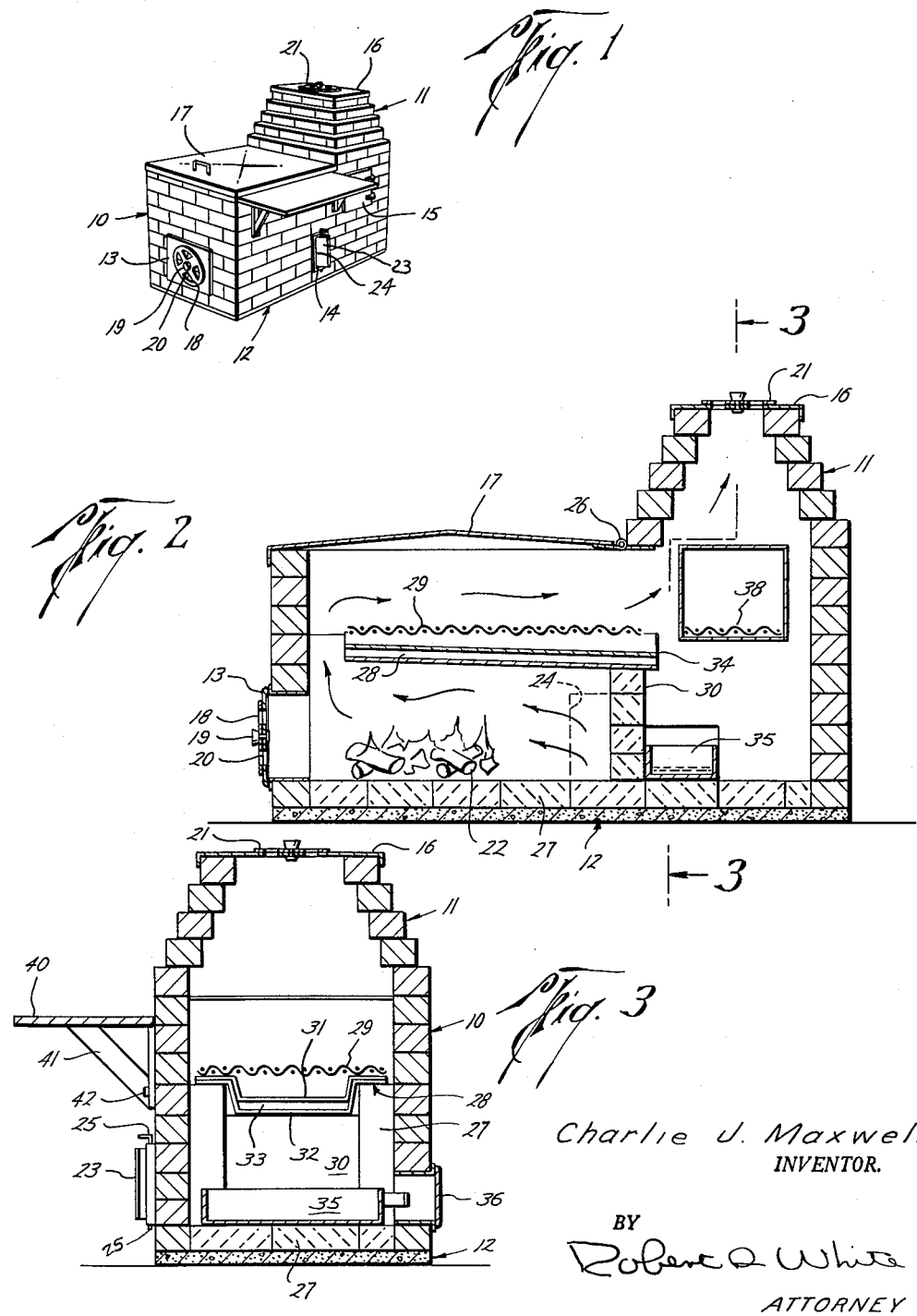
Charlie J. Maxwell
INVENTOR.
BY Robert A. White
ATTORNEY

United States Patent Office 3,098,428
Patented July 23, 1963

3,098,428
MASONRY BARBECUE PIT
Charlie J. Maxwell, 8699 Gulf Freeway, Houston 17, Tex.
Filed Oct. 6, 1961, Ser. No. 143,472
2 Claims. (Cl. 99—446)

My present invention relates to certain improvements in masonry barbecue pits which contribute to the production of units of the proper size, weight and design to be fabricated in a plant and transported by relatively light handling equipment to their place of intended use on the premises of a residential or commercial establishment, while also providing superior performance in the field of outdoor roasting and broiling.

Outdoor cooking units have become quite common in recent years, and many types have been proposed. Although small metal ovens of various types have found favor with some, the preferred unit has continued to be a more or less permanent masonry structure. It is to this type of device that my invention is directed.

The continuing preference for masonry pits bears witness to their superiority over metal ovens. However, several factors have combined to cause many individuals to forego the better cooking qualities of the former in favor of the marginal performance and inconvenience of the latter. One of the most significant of these factors is cost. Heretofore, many have been compelled to do their outdoor cooking in an inadequate and unsightly metal can because of their inability or reluctance to bear the cost of erecting a masonry structure. Thus, it is one of the primary objects of my invention to provide a masonry barbecue pit which may be manufactured at a substantially smaller cost than that of previously available units of this nature.

Another disadvantage of previous masonry barbecue pits is the disorder which usually accompanies their on-premises construction. Not only do the masons appropriate a substantial area over a considerable period of time for their endeavors, but also they often damage the grass or plants in the vicinity of their work and leave an unsightly accumulation of trash when they are finished. Thus, it is another object of my invention to provide a masonry barbecue pit which can be constructed at a site remote from the premises of the ultimate user and readily transported thereto by relatively light lifting and handling apparatus.

Another object of my invention is to provide an attractive and efficient masonry barbecue pit having improved cooking qualities as the result of improvements in the internal draft arrangements, whereby substantially better taste and quality are achieved.

It is also an object of my invention to provide means to collect and retain grease and other drippings from the cooking food and prevent excessive smoke and cooking odors from the fire.

It is a further object of my invention to provide a barbecue pit in which a grease drip tray of novel design is interposed between the source of heat and the food being cooked in order to reduce the direct heat from the fire and position the food in the path of circulation of the hot air currents and wood smoke.

The foregoing and certain other objects which will become apparent are inherent in my barbecue pit which is characterized by the following: (1) Optimum size for plant fabrication, ready handling and passage through restricted openings such as gates in residential fences, all without the sacrifice of capacity or quality; (2) improved internal structure for effective heat distribution and cooking quality; and (3) additional optional features including conveniently arranged fire control dampers, grease collecting means and other improvements described herein and shown in the attached drawings in which:

FIG. 1 is a perspective view of a barbecue pit constructed in accordance with my invention;
FIG. 2 is an enlarged side elevational section showing the internal structure of a barbecue pit incorporating my invention; and
FIG. 3 is a section along line 3—3 in FIG. 2.

FIG. 1 shows a barbecue pit comprising a masonry firebox portion indicated generally by reference numeral 10 and a smokestack indicated generally by reference numeral 11 in communication therewith. The pit is based upon a concrete slab 12. There is a fire door 13 in the end of the firebox portion, a laterally opening damper 14 toward the smokestack end of the firebox, a laterally opening Dutch oven door 15 on the smokestack, a removable cover 16 atop the smokestack, and a lid 17 which rests atop the masonry wall defining the cooking area of the firebox portion.

FIG. 2, an enlarged section along the longitudinal axis of the pit shown in FIG. 1, reveals the details of the features which lend novelty to my construction. The fire door 13 is seen to have a conventional rotary damper incorporated therein, whereby the air flow through the door can be controlled by rotation of the damper member 18 about the pin 19 to vary the effective opening of the fixed apertures 20 within the door. Further, the smokestack cover 16 has a similar damper arrangement indicated generally by reference numeral 21.

Although the firebox door damper and smokestack cover damper are desirable features, the primary source of air for combustion of the wood or charcoal fire 22 is provided by the lateral damper 14. This element is shown in the form of a closure member 23 which is rotatable about the vertical center line of the frame 24 on the pivots 25, but it is apparent that here as in the other damper locations, any of several conventional variable opening dampers will suffice. The arrows within the firebox portion of the pit in FIG. 2 show the direction of air flow and the improved cooking performance which results therefrom will be made apparent subsequently herein.

I prefer that the lid 17 be hinged as by the pin 26 at the smokestack end thereof. This permits the lid to be rotated into a substantially vertical position and rested against the smokestack 12 to afford access to the interior of the pit.

The firebox of my pit is lined with fire brick 27 as shown in FIGS. 2 and 3. These bricks extend partway up the walls of the firebox, and the grease drip tray 28 and grill 29 rest thereon. There also is a baffle wall 30 of fire brick at the rear of the firebox. This element prevents air circulation directly from damper 14 to the smokestack.

The drip tray 28 is of novel construction, having upper and lower surface plates 31 and 32 with an insulating air space 33 therebetween. This arrangement reduces the transfer of heat from the fire 22 directly to the grill 29, so that the effective cooking heat is carried by the air and smoke circulating along the grill.

The trough-like shape of the grease drip tray 28 spaces the substantially horizontal grill 29 a small distance thereabove. Thus, the moving current of hot air and smoke passes both above and below the food as it circulates toward the smokestack.

FIG. 2 shows that the drip tray 28 slopes downwardly toward the smokestack end of the pit so that the grease and cooking juices falling from the food on the grill 29 flow toward the lower end of the tray which is in the form of a lip 34 extending over the top of baffle wall 30. Below the lip is a drip pan 35 which receives and conserves the juices for basting or serving with the food. Removal of the drip pan from the pit is made possible by the lateral opening door 36 shown in FIG. 3. In the presently preferred form of the invention, the door 36 is on the side of the pit opposite the damper 14 and Dutch oven door 15.

Within the intermediate portion of the smokestack 11 is the Dutch oven grate 38 which is attached directly to the masonry walls of the structure. The combustion gases pass through the Dutch oven area and thence up the smokestack. The door 15 provides access to the Dutch oven.

The above described internal arrangement provides improved cooking characteristics, and the additional aspect of my invention is the accomplishment of such a goal in a relatively small and light weight masonry pit. For passage through restricted openings and for transportation over grass or relatively tender vegetation, my pit is of a width of approximately three and one half bricks or 28 inches. Its length is six bricks or approximately 48 inches, and its height is nine courses of brick plus the thickness of the masonry slab or approximately 28 inches at the firebox portion and 14 courses or 42 inches at the smokestack, all dimensions including mortar joints. This design, based on a modular brick dimension, facilitates manufacture and contributes to the economy of the unit. Its weight of approximately 2000 pounds is easily handled by relatively light equipment.

Among the additional desirable feeatures which might be incorporated in my barbecue pit is the work table 40 (FIG. 3) attached thereto for the coonvenience of the user. This element is attached to the pit by bracket members 41 and bolts 42.

Although various changes in my invention might occur to one skilled in this art, it is my intention to protect by Letters Patent all such modifications as fall within the scope of the following claims.

I claim:

1. A portable barbecue pit comprising a concrete base member, masonry walls affixed to said base member about the perimeter thereof to define an interconnected firebox and open-top masonry smokestack, a fire door in the masonry wall at one end of said firebox, a removable cover atop said masonry walls over the firebox, a grill mounted on said masonry walls spaced above said base member over the firebox, a drip tray mounted on said masonry walls below said grill spaced apart from said firebox door end wall, said drip tray comprising a top member and a bottom member joined at their edges with an insulating air space therebetween, a baffle wall between the firebox and the smokestack extending upwardly to the bottom of said drip tray, and an adjustable laterally-opening damper in one side wall adjacent said baffle wall and opening into the firebox.

2. The combination of claim 1, a drip pan adjacent the smokestack side of said baffle wall and below the smokestack end of said drip tray, and a laterally opening door in one side wall for removal of said drip pan therethrough.

References Cited in the file of this patent
UNITED STATES PATENTS

| | | |
|---|---|---|
| 219,492 | McCue | Sept. 9, 1879 |
| 1,104,511 | Kalfus | July 21, 1914 |
| 1,452,907 | Campbell | Apr. 24, 1923 |
| 1,896,192 | Cain | Feb. 7, 1933 |
| 2,311,366 | Carey | Feb. 16, 1943 |
| 2,314,627 | Millikan | Mar. 23, 1943 |
| 2,350,948 | Walker | June 6, 1944 |
| 2,626,559 | Rau | Jan. 27, 1953 |
| 2,787,995 | Alter | Apr. 9, 1957 |
| 2,851,941 | Cogar | Sept. 16, 1958 |
| 2,894,448 | Henderson | July 14, 1959 |

OTHER REFERENCES

Book of Successful Fireplaces: The Donley Brothers Co.; October 1947; pp. 77 and 78.

How to Plan and Build a Better Fireplace: Majestic Co., Inc., 1958; pp. 59 and 61.